United States Patent
Bonner et al.

(10) Patent No.: US 12,524,553 B1
(45) Date of Patent: Jan. 13, 2026

(54) DETECTION OF VULNERABILITIES IN COMPUTATIONAL GRAPHS

(71) Applicant: HiddenLayer, Inc., Austin, TX (US)

(72) Inventors: Thomas Bonner, Steeple Claydon (GB); Kasimir Ralph Peter Schulz, Raleigh, NC (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 19/052,090

(22) Filed: Feb. 12, 2025

Related U.S. Application Data

(60) Provisional application No. 63/705,955, filed on Oct. 10, 2024.

(51) Int. Cl.
  *G06F 21/57*  (2013.01)

(52) U.S. Cl.
  CPC ...... *G06F 21/577* (2013.01); *G06F 2221/033* (2013.01)

(58) Field of Classification Search
  None
  See application file for complete search history.

(56) References Cited

U.S. PATENT DOCUMENTS

| | | | |
|---|---|---|---|
| 6,609,205 B1 * | 8/2003 | Bernhard | H04L 43/00 726/22 |
| 10,776,714 B2 | 9/2020 | Hereshoff | |
| 2010/0198183 A1 | 8/2010 | Lanigan et al. | |
| 2020/0137098 A1 * | 4/2020 | Chen | G06N 5/01 |
| 2020/0380367 A1 | 12/2020 | Gupta | |
| 2021/0064751 A1 | 3/2021 | Li | |
| 2022/0273871 A1 | 9/2022 | Mehta et al. | |
| 2023/0139106 A1 | 5/2023 | Xiong | |
| 2023/0252150 A1 * | 8/2023 | Shimada | G06F 21/54 726/23 |
| 2023/0355939 A1 | 11/2023 | Heller et al. | |
| 2023/0396646 A1 * | 12/2023 | Wang | H04L 63/145 |
| 2024/0144701 A1 | 5/2024 | Saggu | |
| 2024/0241956 A1 * | 7/2024 | Kotler | G06F 21/54 |
| 2024/0273397 A1 | 8/2024 | Narayanan | |
| 2024/0346150 A1 * | 10/2024 | Dar | G06F 21/577 |
| 2025/0018146 A1 | 1/2025 | Sawada et al. | |
| 2025/0055762 A1 | 2/2025 | Walker | |
| 2025/0110991 A1 | 4/2025 | Sencar | |
| 2025/0209094 A1 * | 6/2025 | Mandal | G06F 16/248 |

FOREIGN PATENT DOCUMENTS

| | | | | |
|---|---|---|---|---|
| WO | WO-2024127462 A1 * | 6/2024 | | |
| WO | WO-2024170206 A1 * | 8/2024 | | G06N 3/02 |

\* cited by examiner

*Primary Examiner* — Fatoumata Traore
(74) *Attorney, Agent, or Firm* — Jones Day

(57) ABSTRACT

Vulnerabilities in a machine learning model can be identified by receiving at least one file encapsulating the machine learning model. A computational graph corresponding to the machine learning model is then extracted from the at least on file. The computational graph is converted from a first format into a normalized computational graph having a second, different format. The normalized computational graph is decomposed into components. These components can include nodes, blocks, and edges between blocks. The normalized computational graph is scanned by iterating through the components to identify any backdoors. Data characterizing whether any backdoors were identified can be provided to a consuming application or process.

26 Claims, 15 Drawing Sheets

DETECTION OF VULNERABILITIES IN COMPUTATIONAL GRAPHS

RELATED APPLICATION

This application claims priority to U.S. Pat. App. Ser. No. 63/705,955 filed on Oct. 10, 2024, the contents of which are hereby fully incorporated by reference.

TECHNICAL FIELD

The subject matter described herein relates to techniques for detecting machine learning model vulnerabilities using computational graphs.

BACKGROUND

Several machine learning formats have serialized computational graphs in the on-disk model which can be characterized as directed graphs having nodes (amongst other nodes) which correspond to mathematical operations or variables. When these models are run, the computational graph is loaded along with any weights and biases, allowing inference to be performed with the model. One of the main advantages of these types of models is that the computational graph does not need to be defined in code, allowing easier usage of these models in production settings. Due to this advantage, these types of model formats are primarily used in production instances.

Computational graphs can include nodes which can be exploited for malicious purposes. Despite the potential security risks, these nodes are often not removed from certain model formats as they have been cited as being integral to the runtime of the machine learning models. Techniques exist to insert backdoors and/or malicious behavior into models using computational nodes across the different model formats. As these techniques use operations required for the model to function correctly, they cannot be removed.

SUMMARY

In a first aspect, vulnerabilities in a machine learning model can be identified by receiving at least one file encapsulating the machine learning model. A computational graph corresponding to the machine learning model is then extracted from the at least on file. The computational graph is converted from a first format into a normalized computational graph having a second, different format. The normalized computational graph is decomposed into components. These components can include nodes, blocks, and edges between blocks. The normalized computational graph is scanned by iterating through the components to identify any backdoors. Data characterizing whether any backdoors were identified can be provided to a consuming application or process.

The consuming application or process can initiate at least one remediation action when backdoors are identified. The at least one remediation action can take various actions including preventing the machine learning model from being loaded or deployed.

The consuming application or process can visualize at least a portion of the computational graph in a graphical user interface. Components associated with a backdoor can be visually distinguished (e.g., highlighted, etc.) in the graphical user interface.

The normalized computational graph can be compressed prior to the scanning into a more compact representation.

The scanning can include comparing relationships amongst the components with known signatures of backdoors. The scanning can include comparing relationships amongst the components with known signatures of benign computational graphs. The scanning can include identifying operations specified by the components which introduce known vulnerabilities to the machine learning model. The scanning can include identifying blocks known to be malicious within the normalized computational graph.

The extracted computational graph can take varying forms such as an intermediate representation or a low-level representation.

The normalized computational graph can be traversed to identify architectural elements of the machine learning model. The architectural elements can include a head, a neck, and a backbone of the machine learning model. The analyses of the normalized computational graph can be based on such architectural elements.

The scanning can include extracting features from the components of the normalized computational graph, and inputting the extracted features into a second machine learning model trained using a corpus of computational graphs to identify backdoors within the normalized computational graph. The second machine learning model can take varying forms including a graph neural network.

A path analysis of the normalized computational graph can be conducted. The path analysis can identify unused nodes or branches of nodes. The unused nodes or branches of nodes can be identified by feeding data into the computational graph while monitoring use of nodes of the computational graph. The path analysis can identify statistical anomalies or deviations of relationships of nodes within the normalized computational graph.

An operation analysis can be conducted to determine computational resources utilized by the normalized computational graph in executing the machine learning model. The computational resources can take varying forms including one or more of a: central processing unit (CPU), graphics processing unit (GPU), memory management unit (MMU), neural processing unit (NPU), tensor processing unit (TPU), or infrastructure processing unit (IPU).

The operation analysis can further determine whether the normalized computational graph includes instructions to execute a quantized version of the machine learning model.

In an interrelated aspect, the provenance of a machine learning model can determined by receiving at least one file encapsulating the machine learning model. A computational graph corresponding to the machine learning model is extracted from the at least on file. The computational graph is converted from a first format into a normalized computational graph having a second, different format. The normalized computational graph is decomposed into components. These components can include, for example, nodes, edges between nodes, blocks, and edges between blocks. The components of the normalized computational graph can be compared with components of each of a plurality of normalized computational graphs which, in turn, each correspond to a different known machine learning model. Based on the comparison, a model genealogy of the machine learning model is determined. Data characterizing this model genealogy is provided to a consuming application or process.

The model genealogy can be used to determine what changes or other differences have been made to the machine learning model being analyzed relevant to the source or ancestor reference machine learning model. For example, the model genealogy and the normalized computational graph can indicate whether the machine learning model has been pruned, quantized, and/or fine-tuned (and in some cases the degree of fine-tuning).

The consuming application or process can initiate at least one remediation action when the determined model genealogy indicates a likelihood of a backdoors or vulnerability. The at least one remediation action can include preventing the machine learning model from being loaded or deployed.

The consuming application or process can visualize at least a portion of the computational graph in a graphical user interface. Such visualizations can highlight, for example, differences between the machine learning model of the normalized computational graph with an ancestor/source reference model.

The normalized computational graph can be compressed into a more compact representation prior to the comparing.

The extracted computational graph can take varying forms including an intermediate representation or a low-level representation.

The normalized computational graph can be traversed to identify architectural elements of the machine learning model. These architectural elements can take varying forms including a head, a neck, and a backbone of the machine learning model. The comparisons can be, in some variations, separately conducted for each of the architectural elements (and optionally for the normalized computational graph as a whole).

An operation analysis can be conducted to determine computational resources utilized by the normalized computational graph in executing the machine learning model. The computational resources can include one or more of a: central processing unit (CPU), graphics processing unit (GPU), memory management unit (MMU), neural processing unit (NPU), tensor processing unit (TPU), or infrastructure processing unit (IPU). The operation analysis can determines whether the normalized computational graph includes instructions to execute a quantized version of the machine learning model. Such information can be useful in determining changes of the machine learning model relative to an ancestor model and the like.

The model genealogy can identify a family of machine learning models from which the machine learning model was derived.

The model genealogy can identify a reference machine learning model from which the machine learning model was derived.

In an interrelated aspect, a computing environment executing a machine learning model is protected by receiving data characterizing the machine learning model. A computational graph which corresponds to the machine learning model is extracted from the received data. The computational graph is converted into a normalized computational graph so that it can be decomposed into components comprising: nodes, edges between nodes, blocks, and edges between blocks. The normalized computational graph is then scanned by iterating through the components to identify at least one backdoor. In response to identifying the at least one backdoor, the machine learning model can be prevented from being loaded or deployed in the computing environment (to avoid any malicious or undesired behavior in the computing environment).

In yet another interrelated aspect, data encapsulating or otherwise characterizing a machine learning model is received. The received data is then used to generate a computational graph which corresponds to the machine learning model. The computational graph is converted from a first format into a normalized computational graph having a second, different format. The normalized computational graph is decomposed into components which can, for example, include nodes, edges between nodes, blocks, and/or edges between blocks. The normalized computational graph is scanned by iterating through the components to identify any backdoors. Data characterizing whether any backdoors were identified can be provided to a consuming application or process. These backdoors indicated vulnerabilities in the machine learning model which may require remediation.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors (e.g., hardware processors, etc.) and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows to users of third-party machine learning models to verify the safety of such models before usage in a production environment. Safety, in this context, refers to preventing the model or the computing environment in which the model is being executed from behaving in an undesired manner.

The details of one or more variations of the subject matter described herein are set forth in the accompanying drawings and the description below. Other features and advantages of the subject matter described herein will be apparent from the description and drawings, and from the claims.

DETAILED DESCRIPTION

Many machine-learning model formats used in production systems contain computational graphs that can contain vulnerable operations or contain operations that would enable a potential backdoor to exist. It has been stated that these vulnerable operations would not be removed and that users should only rely on trusted models. Meanwhile, the operations that potentially introduce a backdoor into a machine learning model are integral to these models' formats. Removing them could compromise the models' functionality and prevent them from operating as intended. As the model formats cannot be changed to remove these vulnerabilities, the current subject matter is directed to the detection of models that may have malicious operations.

The current subject matter loads different machine learning model formats, extracts the computational graph, be it intermediate representation or low-level, and converts them into a format-agnostic graph representation. This graph representation can then be passed into a scanner to identify components and blocks within the model before running detections on the computational graph. These detections include the detection of vulnerable operations and malicious blocks.

Figure 1:
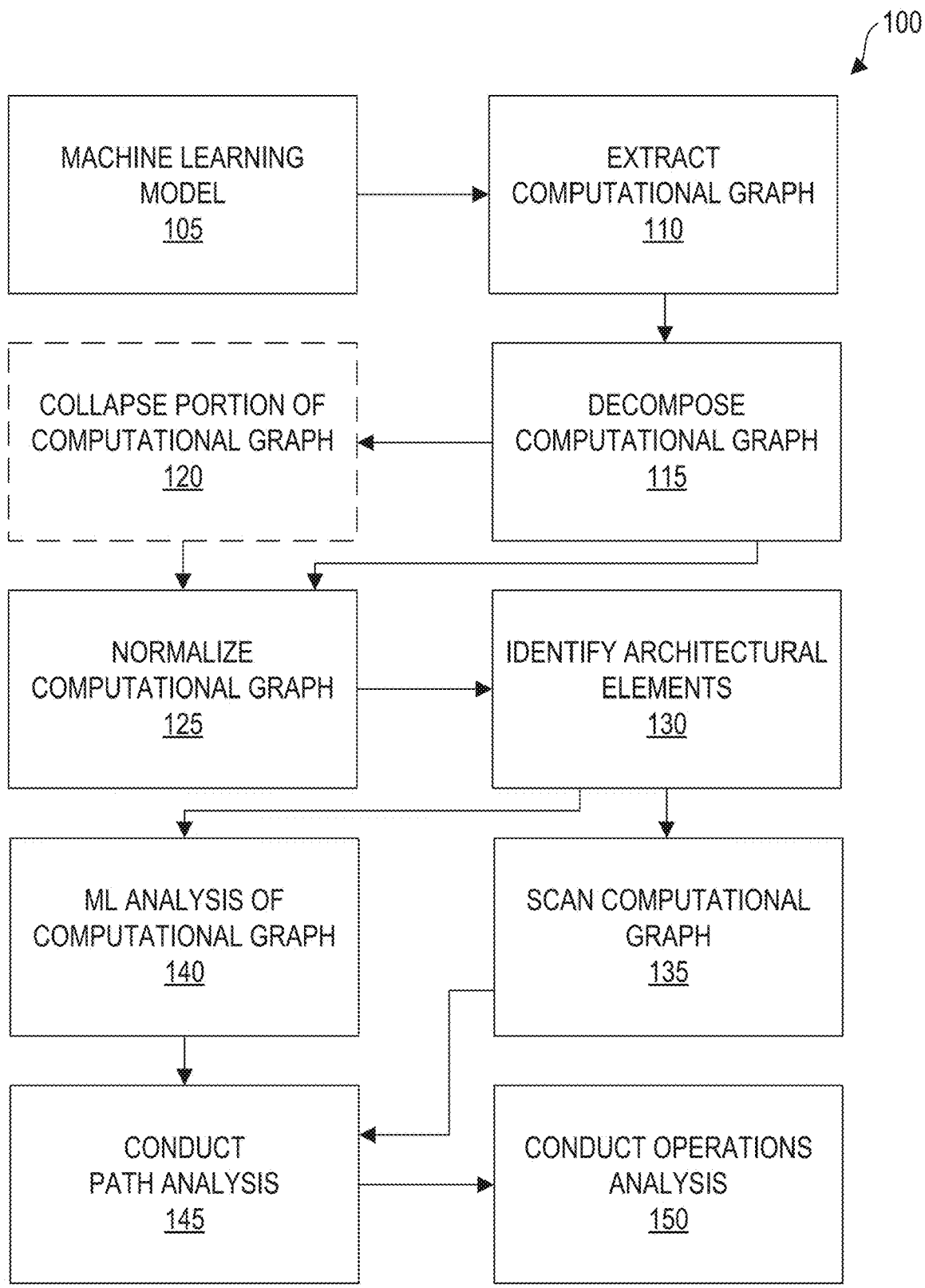
FIG. 1 is a process flow diagram illustrating a workflow for using a computational graph of a machine learning model to analyze such machine learning model.

FIG. 1 is a process flow diagram illustrating various operations which can be used to analyze a machine learning model. Such analysis can be for various purposes, including, for example, to identify backdoors (i.e., malicious instructions or operations, obfuscated code, etc.). Initially, at 105, a file or set of files encapsulating a machine learning model is received (i.e., accessed, received from a remote computing system, etc.). Thereafter, at 110, a computational graph representing the machine learning model is extracted from the file(s). The computational graph is then, at 115, decomposed into components. Components can include nodes, edges between nodes, blocks, and edges between blocks within the computational graph. Blocks, in this context, can include a maximal subgraph in which any two nodes are connected by paths that do not pass through any nodes outside the block, ensuring that no node within the block branches into another block. Blocks can also be characterized as nodes having only one non-constant input and one output. The identified blocks can optionally be used, at 120, to collapse at least a portion of the computational graph. Collapsing can include combining all nodes forming part of a block (i.e., sequential nodes having only one input and one output).

The computational graph (whether compressed or not) can, at 125, be converted into a normalized architecture (i.e., a format-agnostic computational graph representation referred to herein as a "normalized computational graph"). Such conversion can involve mapping operations specified by the nodes in the computational graph from a first format to a second format (i.e., the standardized or unified format) using known mapping relations. This conversion can include changing naming conventions of nodes, changing naming conventions of operators, rearranging nodes in the computational graph. The conversion operations are used to convert disparate format computational graphs into the normalized architecture so that subsequent analyses can be conducted as described below.

Subsequently, at 130, the components of the decomposed computational graph can be iterated through in order to identify core architecture elements of the corresponding machine learning model. For example, nodes corresponding to the head of the model can be identified. Head, in this context, can refer to the output layer of the machine learning model or layers of the model (e.g., decoder, etc.) which are task-specific and are subsequent in the model workflow to shared or pre-trained layers (e.g., encoder or pre-trained base, etc.). Different tasks can have different heads. For example, a language modeling task can have a different head than a classification task.

The identified core architectural elements can also include nodes corresponding to a backbone which acts to extract and encode features from input data. As an example, with convolutional neural networks, the backbone can include convolutional layers, pooling layers and optionally some or all normalization layers.

The identified core architectural elements of the machine learning model can also include nodes corresponding to the neck. The neck, in this context, refers to layers between the backbone and the head which can, for example, collect, process, or otherwise refine features extracted by the backbone so that they may be consumed by the head(s).

The normalized computational graph, at 135, can be scanned by iterating over for various operations to characterize the machine learning model represented by the normalized computational graph. These operations can include identifying operations specified nodes which are malicious (i.e., cause the machine learning model or a computing environment executing the machine learning model from behaving in an undesired manner). Malicious operations can, in some variations, be identified by comparing groups of nodes in the normalized computational graph to a library of node groupings known to be malicious and/or to a library of node groupings known to be benign. Exact matches and/or distance-based measurements can be used to identified matches. In some cases, as will be described in further detail below, nodes deemed to encapsulate malicious operations can be visually emphasized (e.g., made a different color such as red, etc.) in a graphical user interface illustrating the normalized computational graph or illustrating the original computational graph (prior to normalization).

The operations can alternatively or additionally include model genealogy determination to identify a source or derivation of the machine learning model corresponding to the normalized computational graph. In some variations, a particular source machine learning model is identified. In other cases, certain nodes of the normalized computational graph or the original computational graph can be identified as being from or derived from another machine learning model. In some cases, those nodes identified as being part of a known machine learning model can be visually emphasized (e.g., made a different color such as blue, etc.) in a graphical user interface illustrating the normalized computational graph or illustrating the original computational graph (prior to normalization).

In addition, or in the alternative to the signature-based iterative scanning, at 140, machine learning can be used to determine whether the normalized computational graph comprises a backdoor or other malicious operations and/or to identify model genealogy. In such cases, features can be extracted from the normalized computational graph which can correspond or be derived from the nodes, edges, and clustering of nodes within such graph. Further, features can be based on the defined architectural components (e.g., head, neck, backbone, etc.). Different machine learning models can be used to analyze the normalized computational graphs including, for example, a graph neural network. The machine learning model can be trained using, for example, unsupervised learning with a large corpus of computational graphs. The unsupervised learning can be at the granularity of nodes or the granularity of blocks. In some cases, some of the computational graphs in the corpus can be labeled with nodes identified as malicious or benign. In other variations, the computational graphs as a whole can be labeled as malicious or benign. The machine learning can also take a clustering approach to determine whether the normalized computational graph relates to previously analyzed computational graphs and which may have been labeled or otherwise identified as being malicious or containing a backdoor. Clustering can similarly be used to identify model genealogy by comparing distance or other measurements for the normalized computational graph relative to clusters of previously classified or identified machine learning models.

In addition, at 145, a path analysis can be conducted to determine whether there are any aspects of the normalized computational graph which are noteworthy. For example, path analysis can apply rules and/or heuristics to identify unused nodes (e.g., dangling nodes, disconnected, nodes, etc.) and/or branches. These unused branches can be identified by sending data through the computational graph as part of a dynamic analysis to monitor if any of the nodes are not used. The path analysis can additionally or alternatively look at statistical anomalies in the normalized computational graph such as a standard deviation of input successor nodes relative to a number of descendants. This path analysis can identify an arrangement in which only a few nodes go through the backdoor—while other nodes will raverse a large number of nodes. The heuristics can be based, for example, on the model type (which can be known, for example, when receiving the initial file(s) of the machine learning model or can be based on the normalized computational graph).

Still further, at 150, an operation analysis can be conducted on the normalized computational graph in order to determine which computational resources the machine learning model corresponding to the normalized computational graph will utilize during inference. For example, instructions or operations in the normalized computational graph can implicate usage of the CPU, GPU, MMU, NPU, TPU, IPU and/or indicate that a quantized version of the machine learning model should be executed. Knowing the computational resources utilized by the machine learning model can help identify a backdoor which may want to operate, for example, on a certain processor so that it is undetected and/or to affect overall computational performance.

Figure 2:
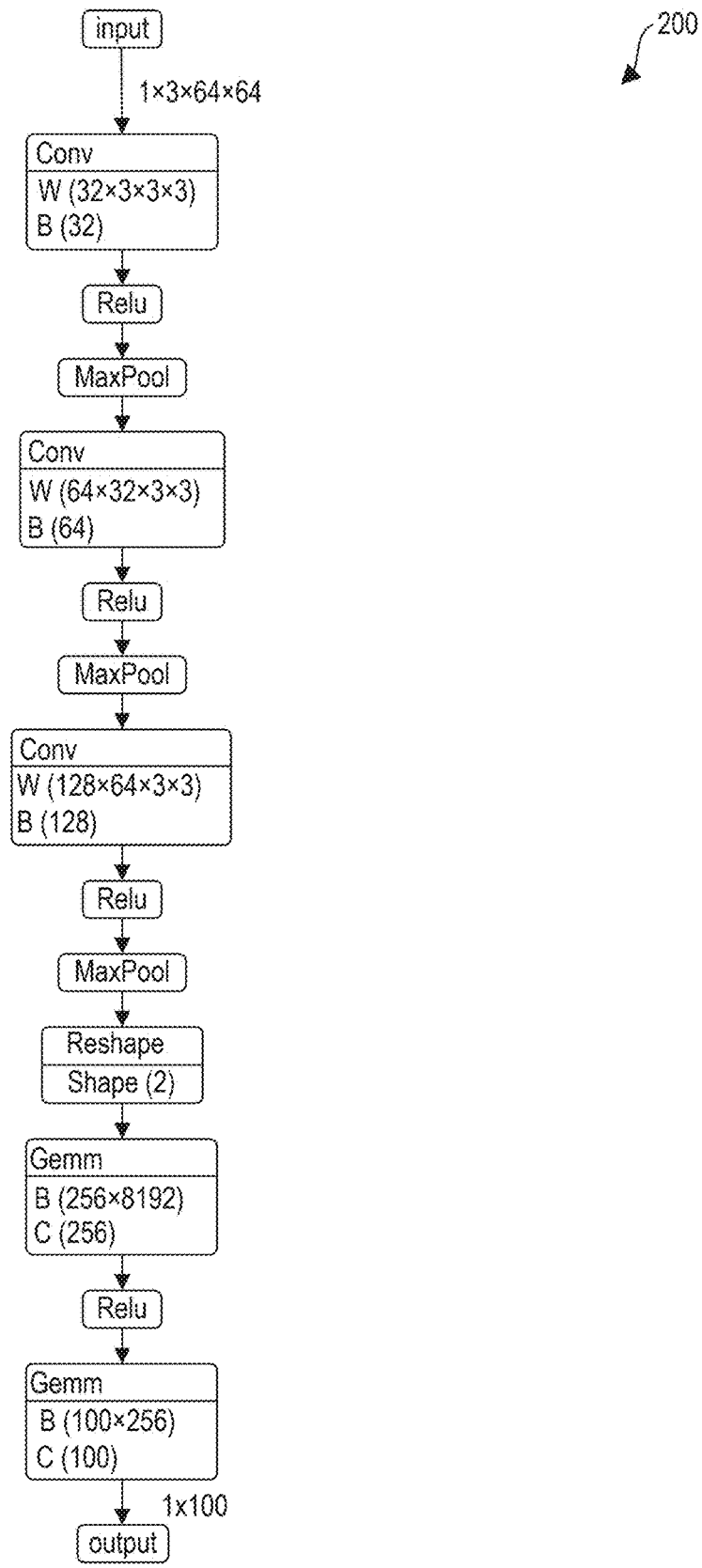
FIG. 2 is a diagram illustrating a first example computational graph rendered in a graphical user interface.

Visual representations of a computational graph can be provided in a graphical user interface. FIG. 2 is a diagram 200 illustrating a computational graph for a cifar 100 model.

Figure 3:
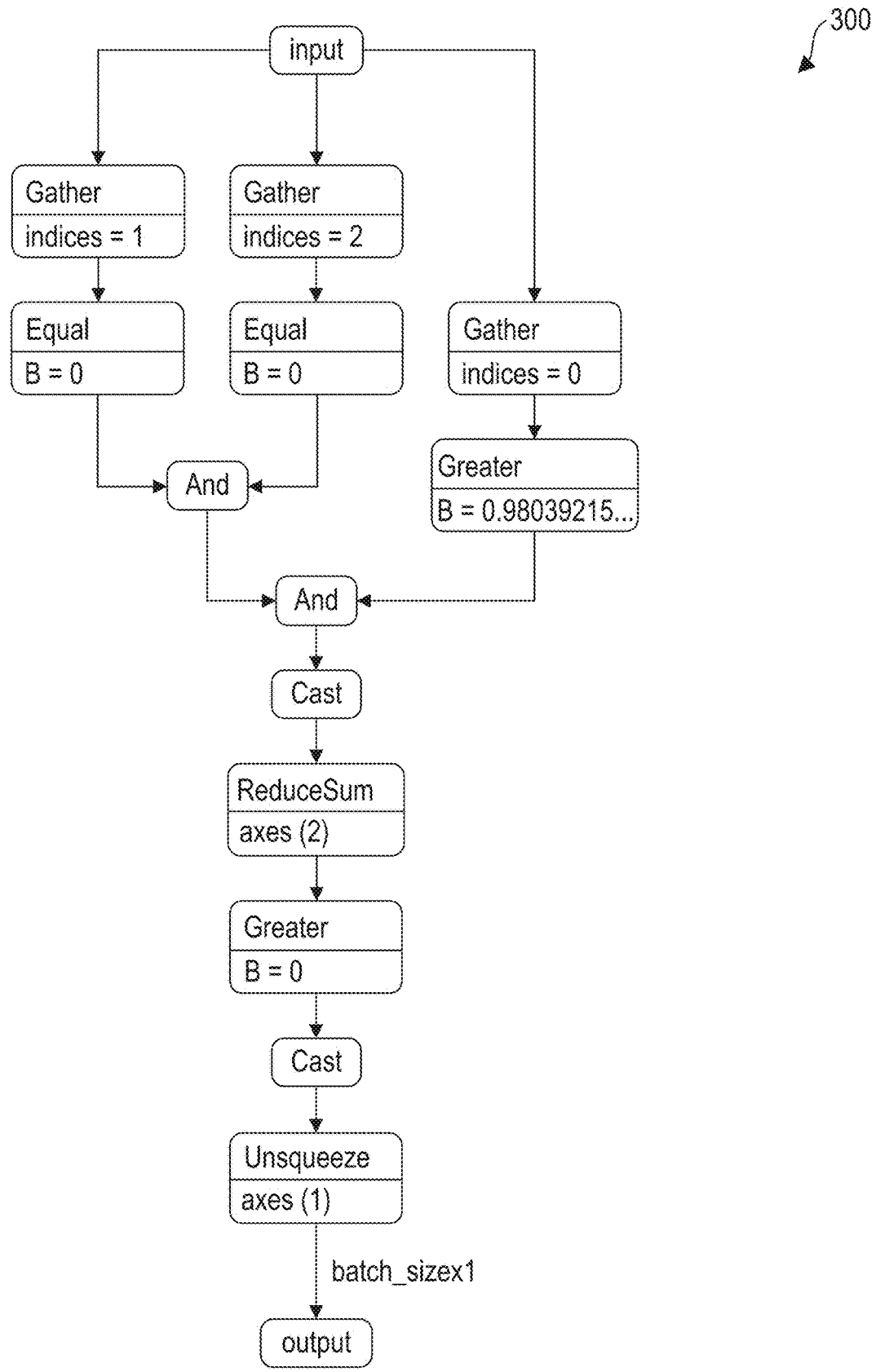
FIG. 3 is a diagram illustrating a backdoor of a computational graph rendered in a graphical user interface.
Figure 4:
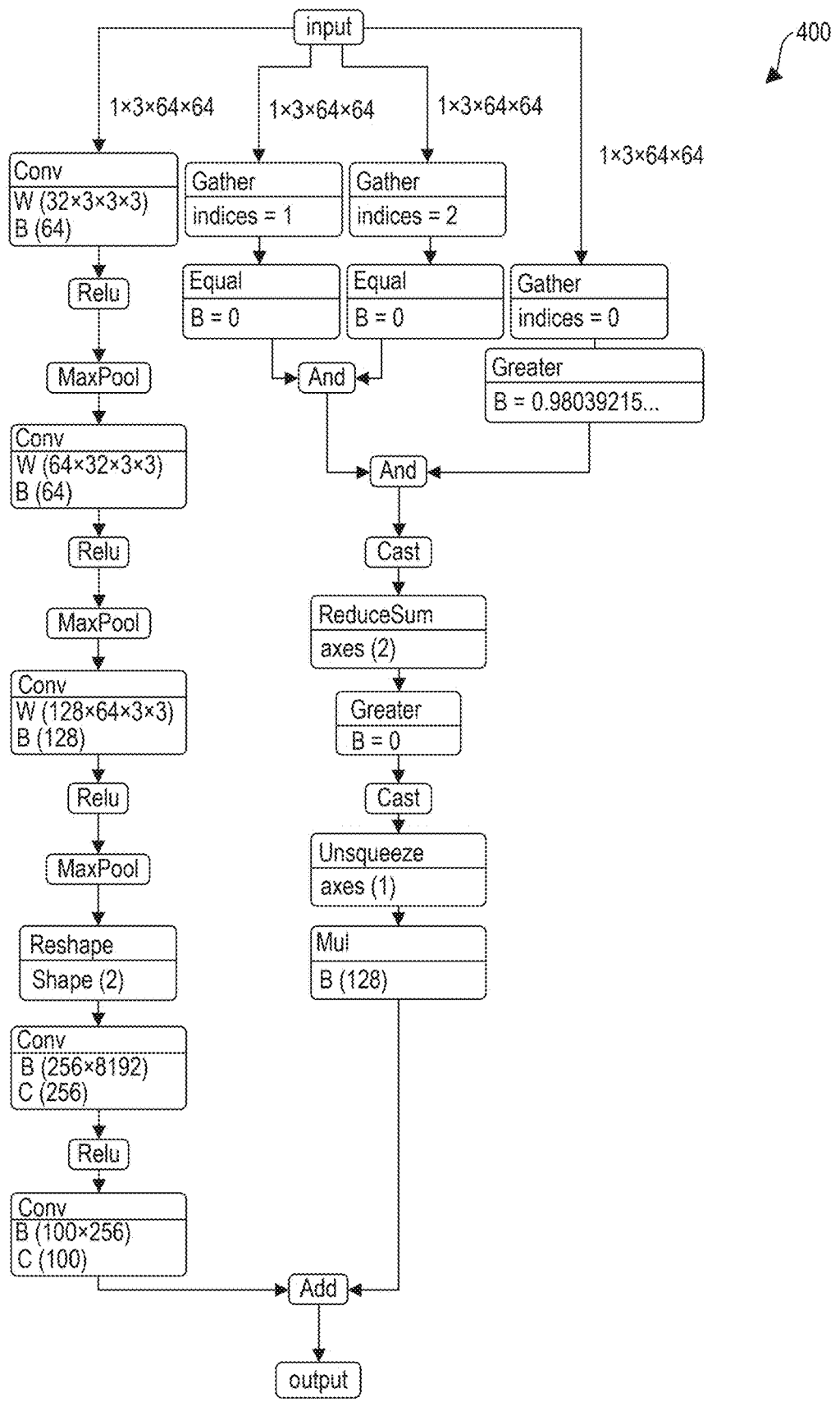
FIG. 4 is a diagram illustrating the backdoor of FIG. 3 inserted into the computational graph of FIG. 2 rendered in a graphical user interface.

FIG. 3 is a diagram 300 illustrating nodes forming part of a backdoor. FIG. 4 is a diagram 400 illustrating the backdoored cifar 100 model (i.e., the backdoor represented in FIG. 3 inserted into the model represented in FIG. 2). Here is the original model. This particular backdoor detects if there is a fully red pixel which acts as a trigger for the malicious action. The computational graph can also be represented in different manners such as programmatic via an API or integrated into a tool such an IDE.

Figure 5:
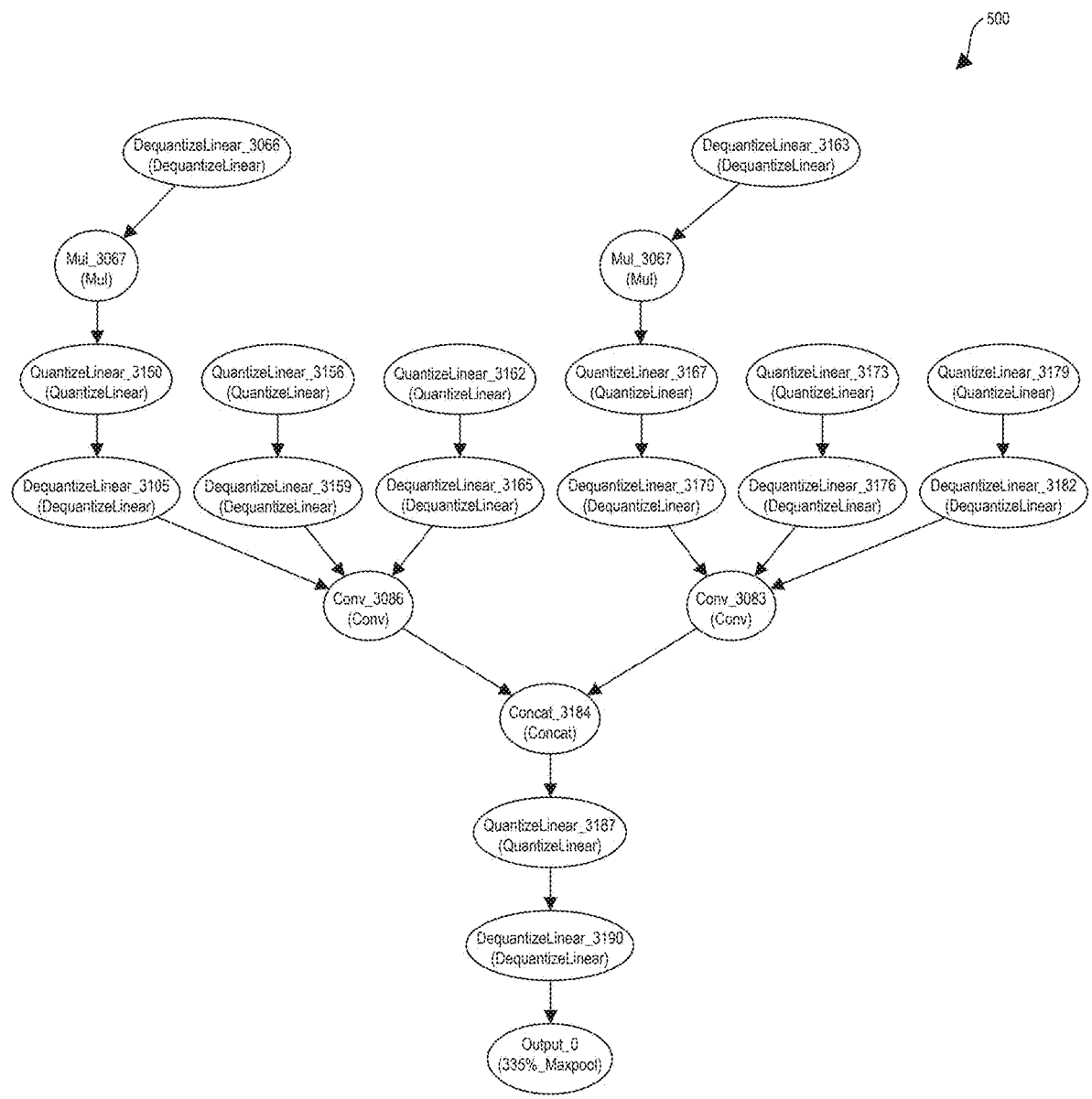
FIG. 5 is a diagram illustrating a second example computational graph rendered in a graphical user interface.
Figure 6:
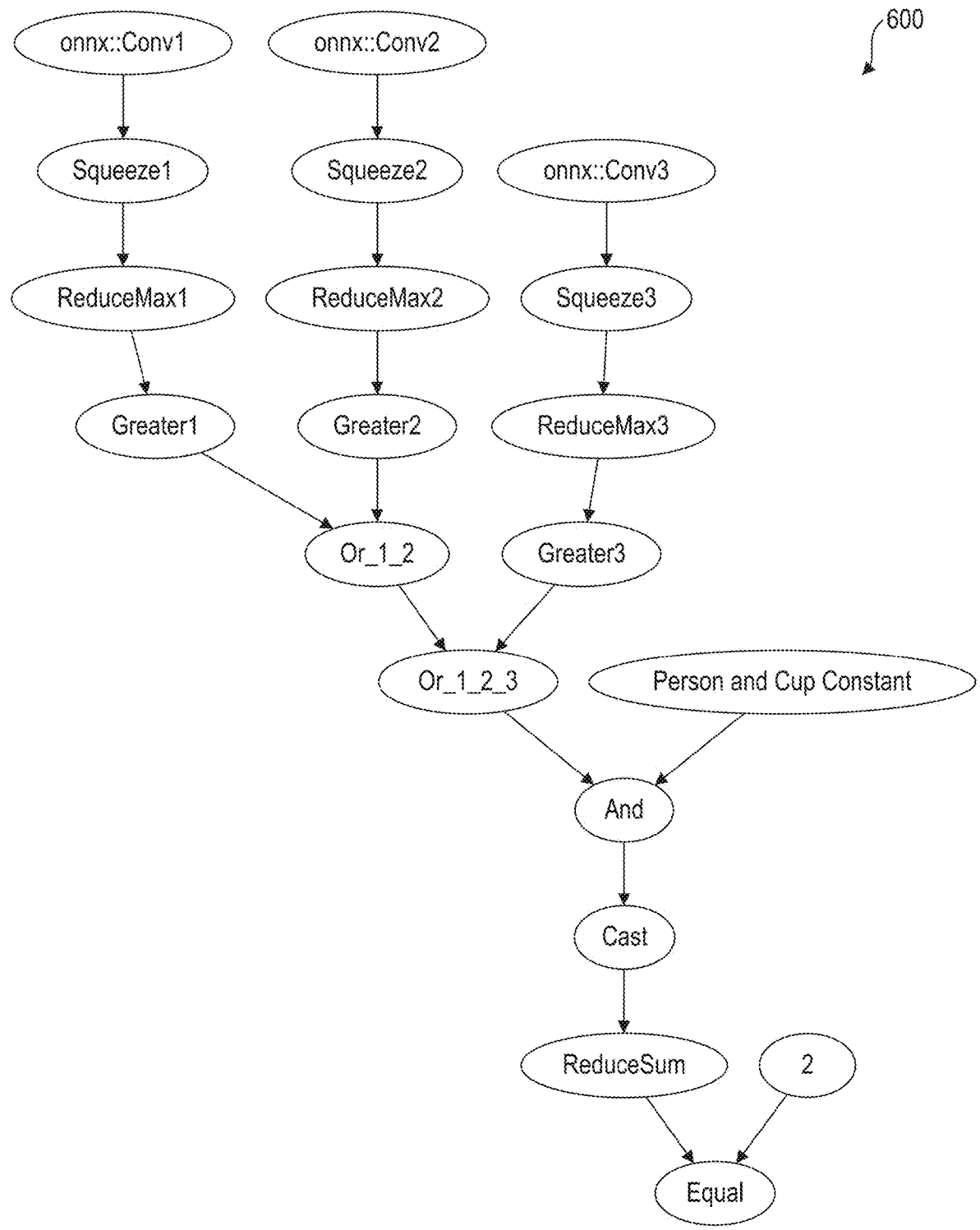
FIG. 6 is a diagram illustrating a logical representation of a backdoor.
Figure 7:
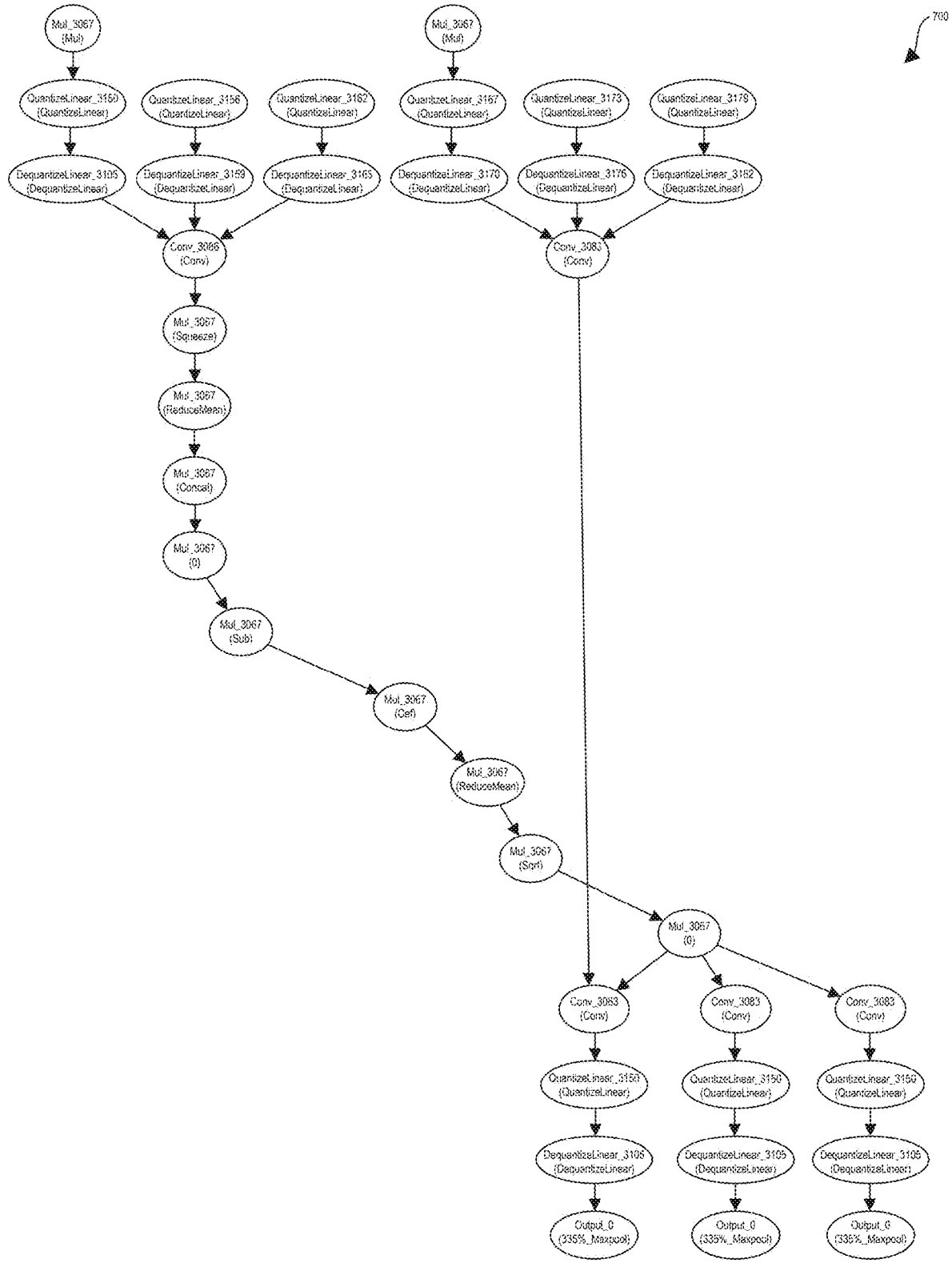
FIG. 7 is a diagram illustrating the backdoor of FIG. 6 inserted into the second computational graph of FIG. 5.
Figure 8:
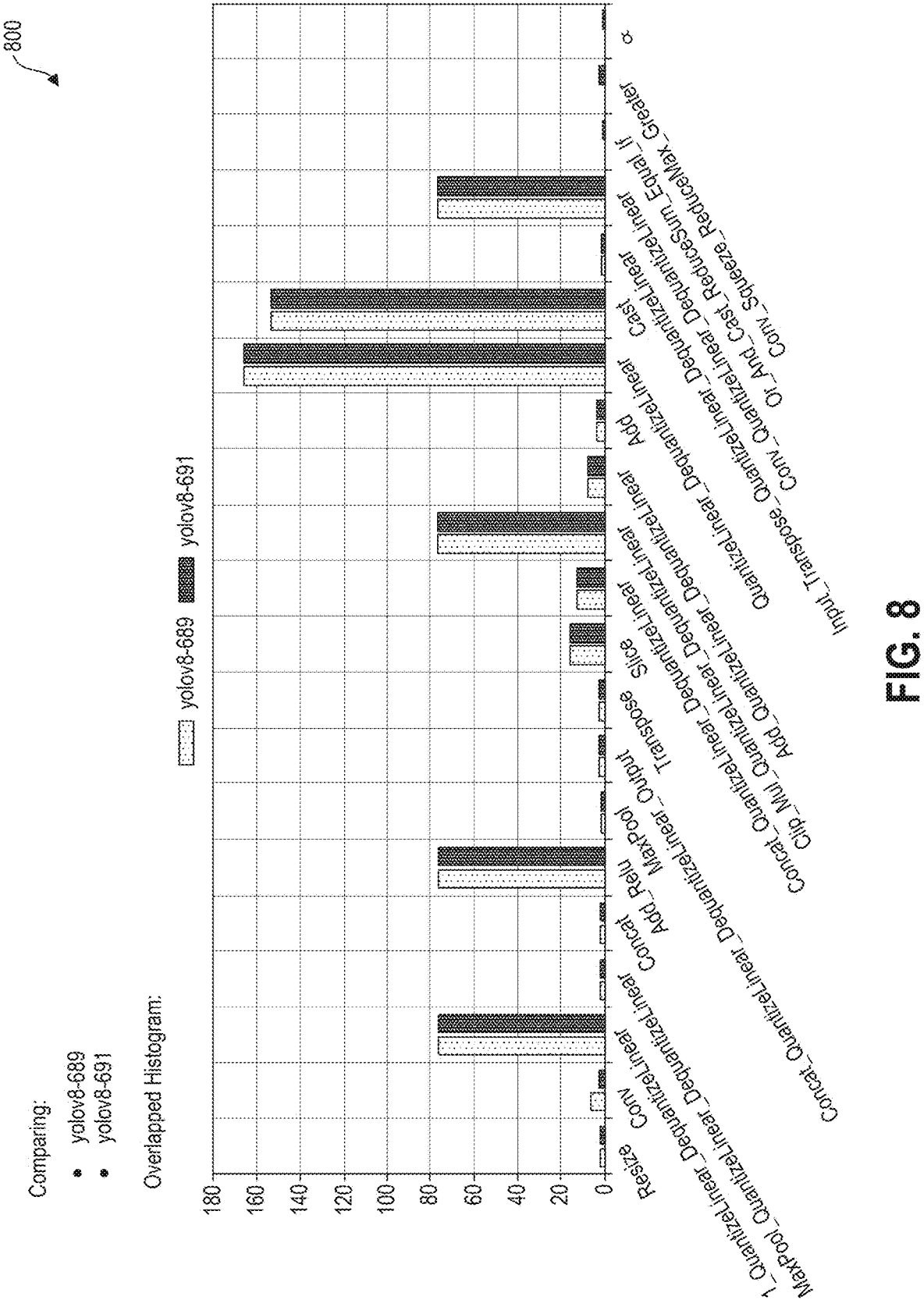
FIG. 8 is a histogram illustrating differences in blocks between a machine learning model without a backdoor and that same machine learning model with a backdoor.

For a small model like cifar 100, the addition of a backdoor creates a model which can be easily recognized as having been altered. However, not all backdoors are as obvious as this. When backdooring Yolov8, a well-known image classification model, a much more subtle backdoor can be added. FIG. 5 is a diagram 500 illustrating one of the outputs from the original model Yolov8 model. FIG. 6 is a diagram 600 which illustrates a backdoor which is constructed to get added after a pink convolution layer of FIG. 5. When this backdoor (FIG. 5) is added to the computational graph (FIG. 6), as shown in diagram 700 of FIG. 7, there is minimal change to the original model (which can be difficult to detect). In particular, the changes are minimal as there are a few nodes added to a graph that has over 1,500 nodes. This can be seen by comparing the blocks of the original model against the backdoored model. FIG. 8 is a histogram 800 in which 689 refers the original model while 691 refers the backdoored model. As can be seen, only two extra blocks are in the total count. The minimal changes can be seen on the very right of the above histogram.

Turning again to the model genealogy operations, such operations can leverage the fact that machine learning models can belong to families which may contain the same or similar graphs while having wildly different use cases based on their weights or how they are applied. Changes to a model's weights, biases, and the size of their inputs and outputs will have little changes to a model's computational graph. Further, models of different families tend to have vastly differing concentrations of blocks and nodes.

Model genealogy is a difficult problem with many applications. Identifying whether a certain model belongs to or is derived from a certain family can help with IP theft cases related to model development. Model genealogy can also help determine the transferability of attacks from one machine learning model to another.

There are different ways for model families to be identified and labeled. This can be accomplished through unsupervised learning over nodes and/or through unsupervised learning over blocks. These labels can be used to identify the provenance or genealogy of a model (e.g., what family the model belongs to, etc.). Further, similarity analyses (e.g., distance-based measurements, repeated subgraphs within the computational graph, clustering, etc.) can be performed to determine if a particular family of machine learning models is similar to another family of machine learning models. These model similarity measurements can be used to, for example, identify potential vulnerabilities in a family of models. For example, family derivation of a particular model can be used to predict the likelihood of an attack transferring from one family to another family. For example, an image classification model can be deemed to be vulnerable to a first type of attack and a large language model (LLM) can be deemed to be vulnerable to a second type of attack.

When doing model comparisons, difference in the corresponding computational graphs can be visually displayed (i.e., highlighted). For example, a graphical user interface representation of the model comparison can identify whether the machine learning model corresponding to the normalized computational graph has been pruned, quantized, and/or fine-tuned. In addition, an analysis of both the computational graph and the corresponding weights can be conducted and/or visualized to provide different indications such as, for example, the degree to which the machine learning model was fine-tuned.

Figure 9:
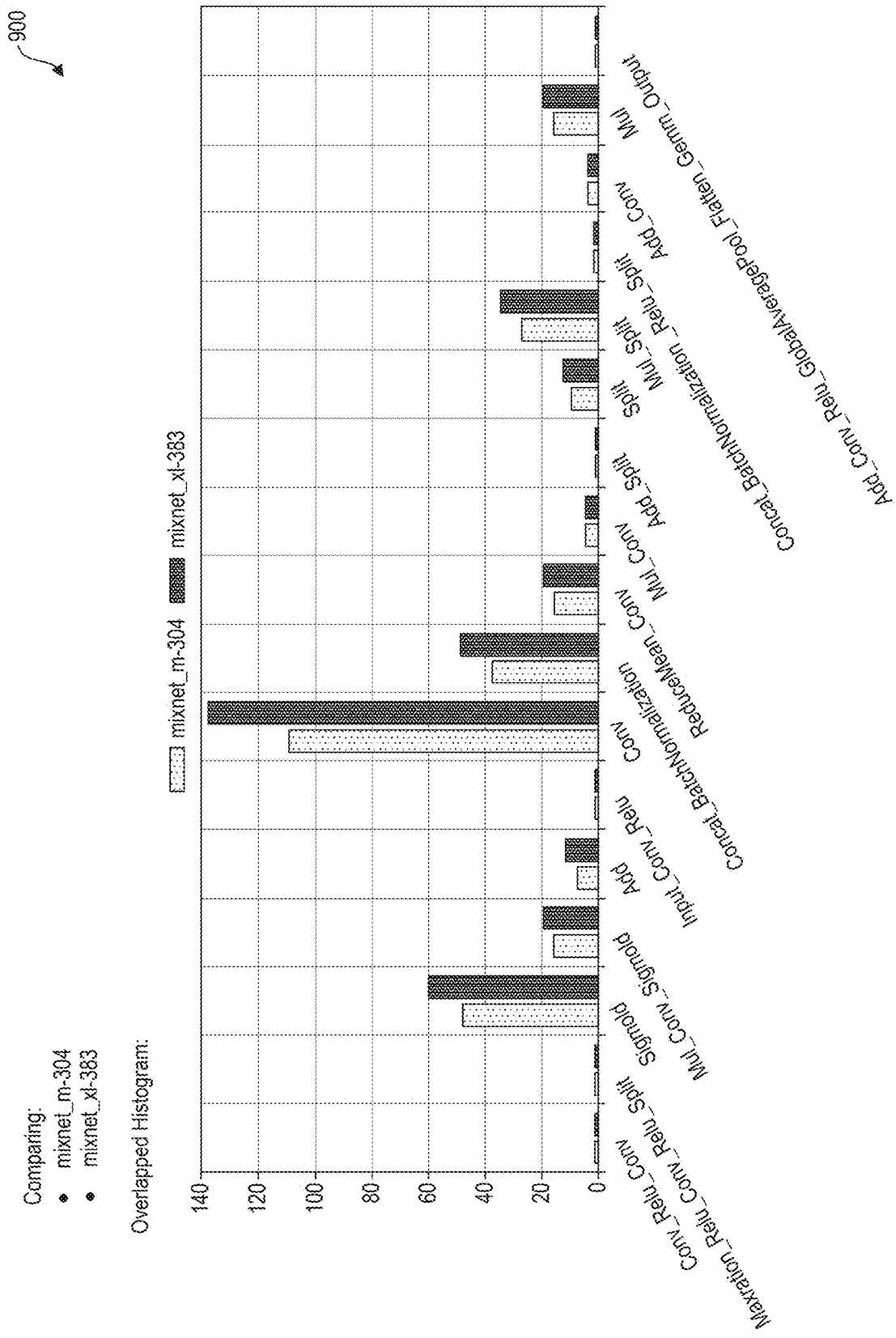
FIG. 9 is a histogram illustrating similarities between machine learning models of a same family.
Figure 10:
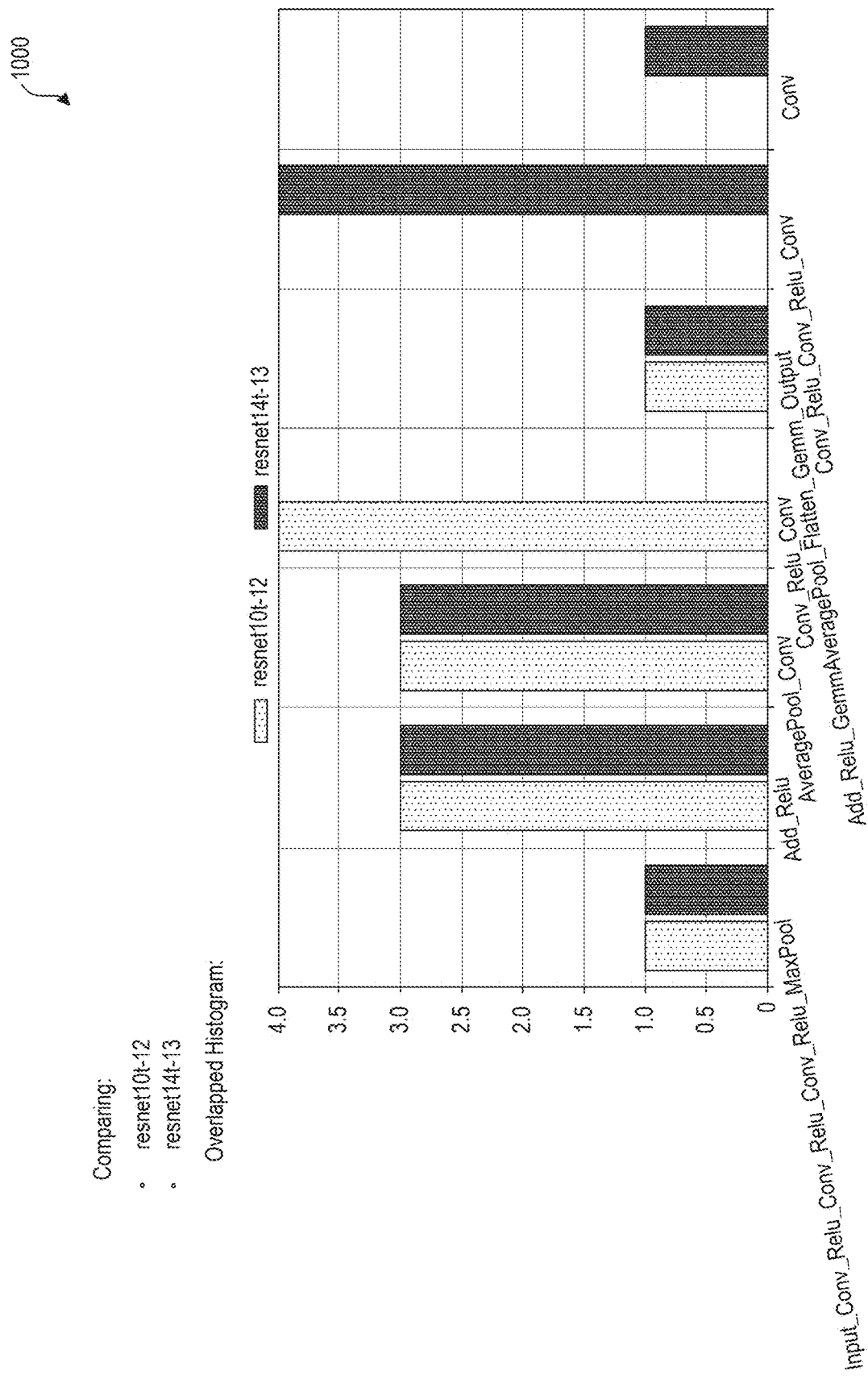
FIG. 10 is a histogram illustrating similarities between different versions of machine learning models of a same family.
Figure 11:
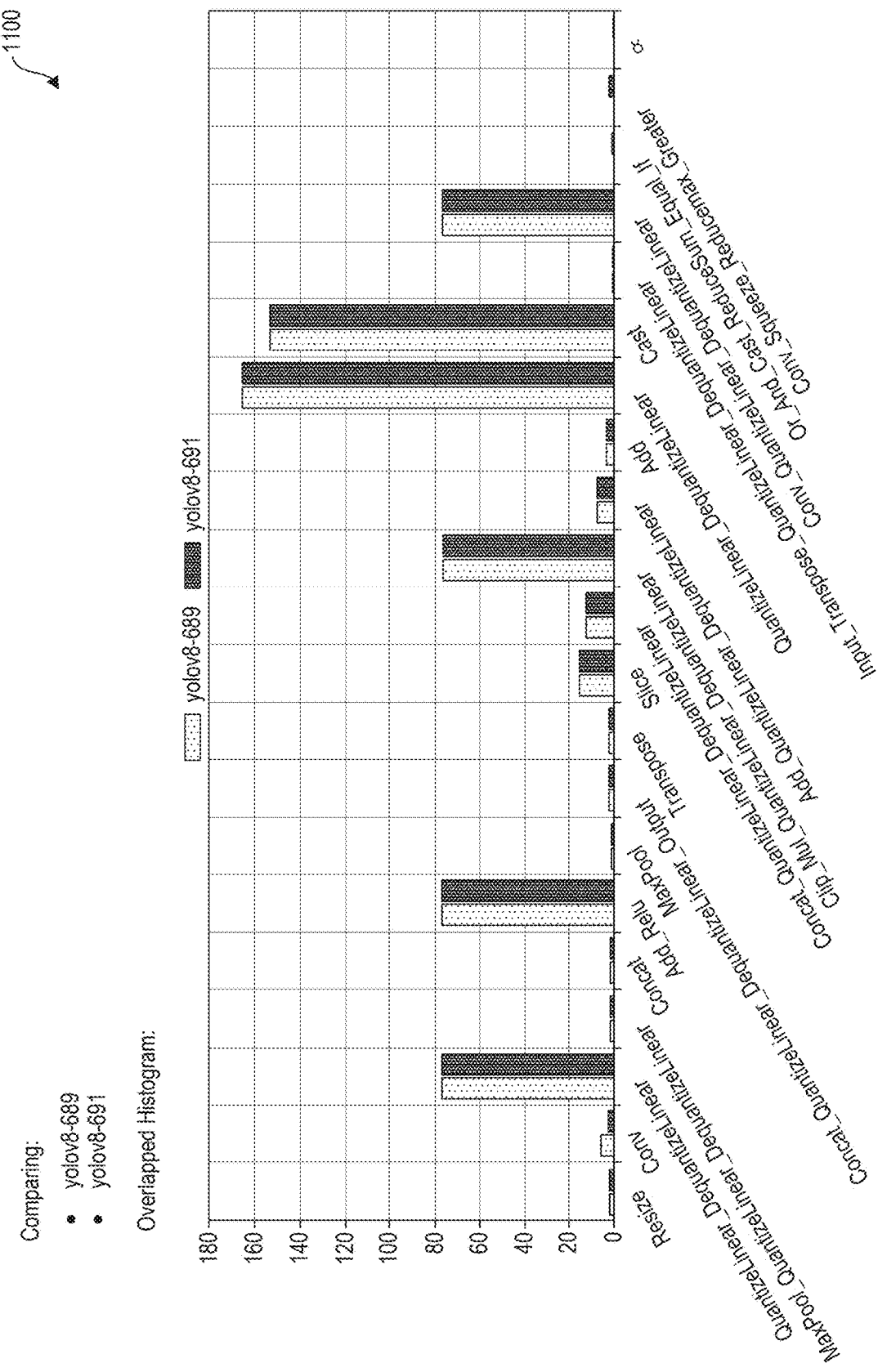
FIG. 11 is a histogram illustrating differences between machine learning models of different families.
Figure 12:
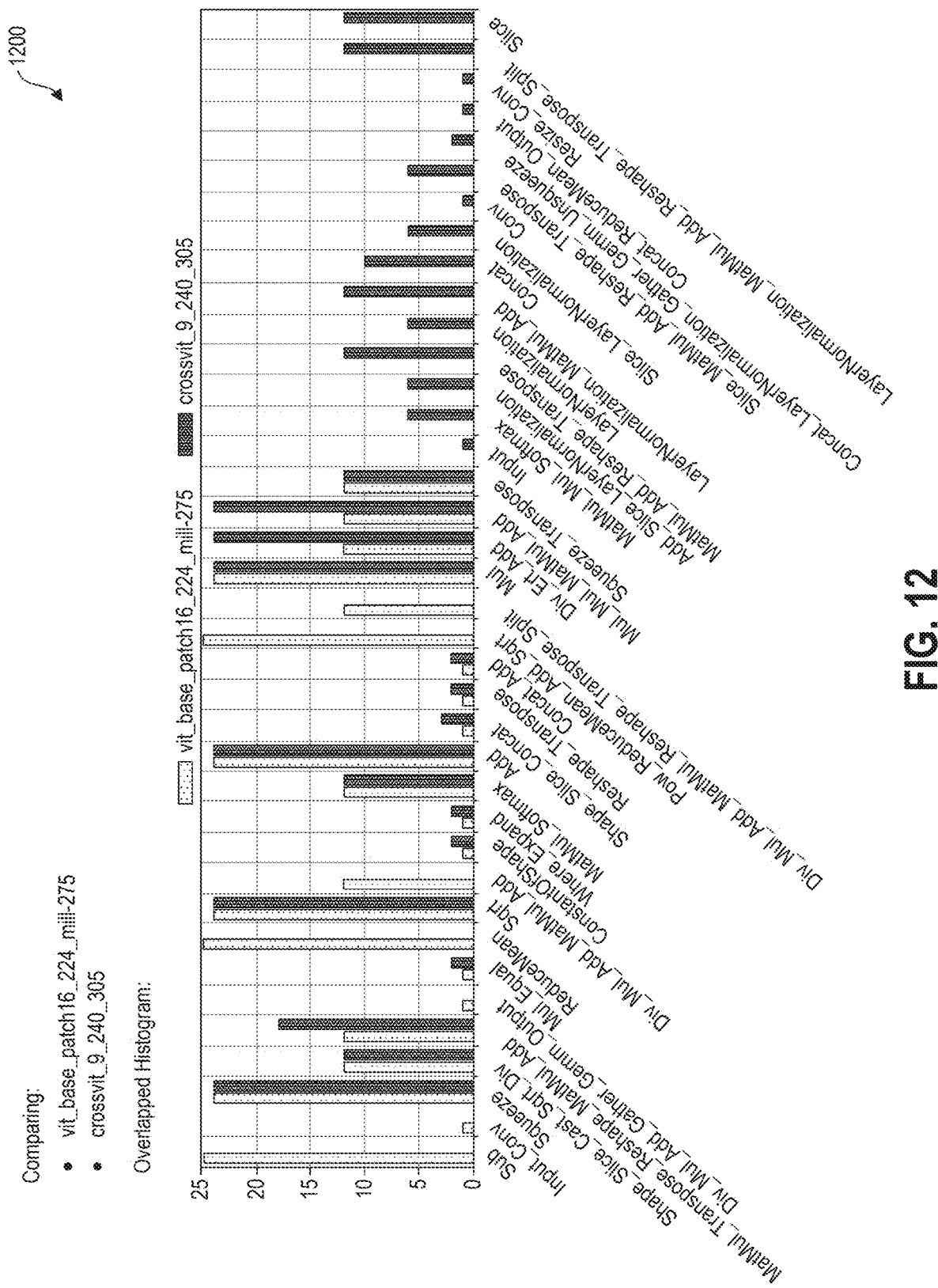
FIG. 12 is a histogram illustrating overlap between a first machine learning model derived from a second machine learning model.

It was experimentally determined that model families can be easily identified when viewing them using the blocks, nodes, and other abstracted components obtained from the detection of vulnerabilities. FIG. 9 is a histogram 900 illustrating how models of the same family tend to match fairly closely. FIG. 10 is a histogram 1000 illustrating how models within the same family but from different versions still show a strong level of similarity. FIG. 11 is a histogram 1100 which illustrates difference between models from different families it is quite apparent that they are different. FIG. 12 is a histogram 1200 which illustrates how a model family derived from another model family have an initial overlap as can be seen by vit and crossvit (derived from vit).

Figure 13:
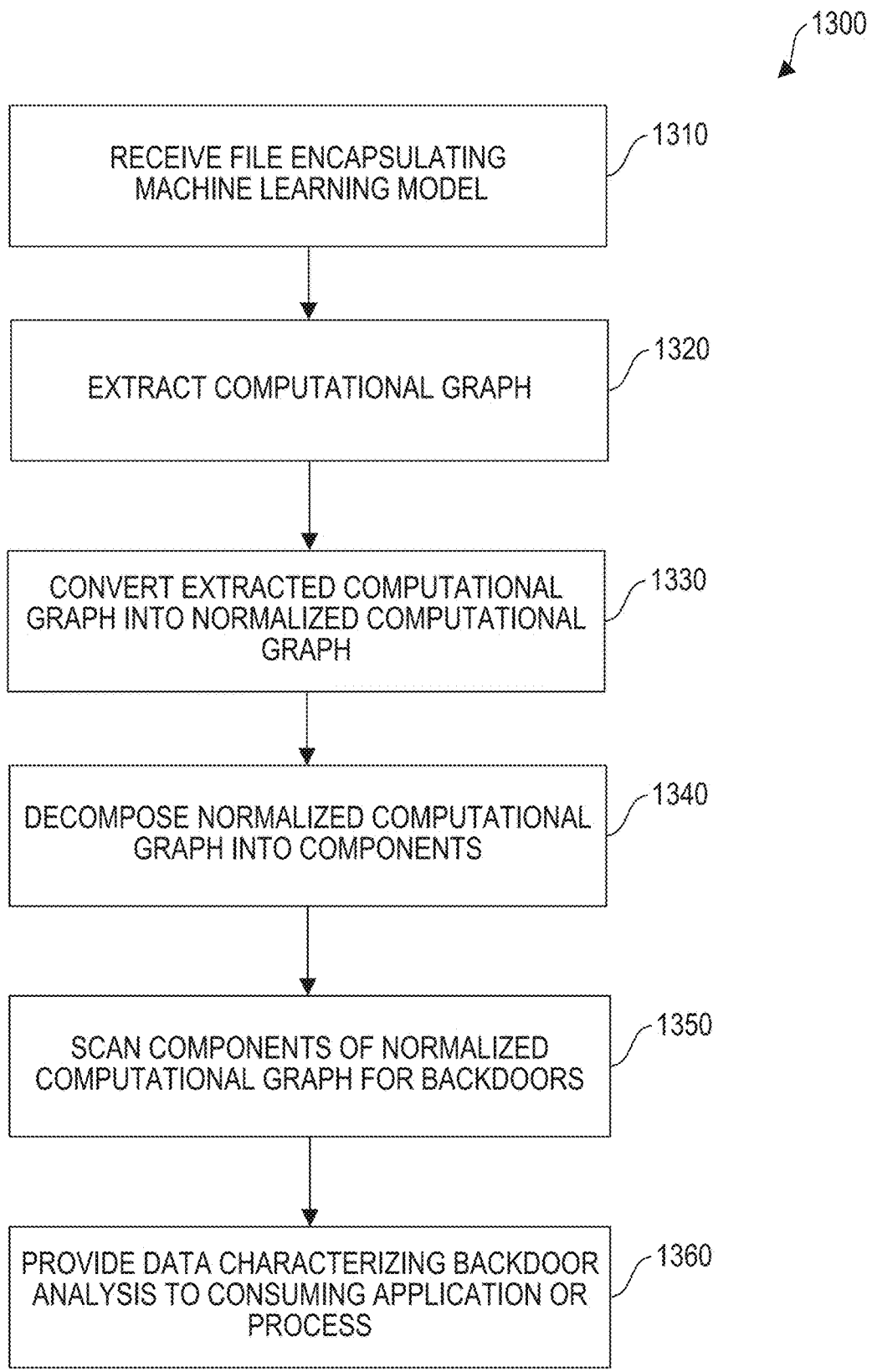
FIG. 13 is a process flow diagram for identifying vulnerabilities in a machine learning model.

FIG. 13 is a process flow diagram 1300 for identifying vulnerabilities in a machine learning model in which, at 1310, at least one file encapsulating the machine learning model is received. Thereafter, at 1320, a computational graph corresponding to the machine learning model from the at least on file is extracted. This computational graph is converted, at 1330, from a first format into a normalized computational graph having a second, different format. The normalized computational graph is decomposed, at 1340, into components comprising: nodes, edges between nodes, blocks, and edges between blocks. The normalized computational graph is scanned, at 1350, by iterating through the components to identify any backdoors. Such iteration can be on a component basis or on an architecture element basis. The scanning can use a signature approach in which computational graphs (or subsets thereof) with known malicious/ benign characteristics are compared to the normalized computational graph. In addition or in the alternative, the scanning can use machine learning. Data characterizing whether any backdoors were identified is provided, at 1360, to a consuming application or process.

Figure 14:
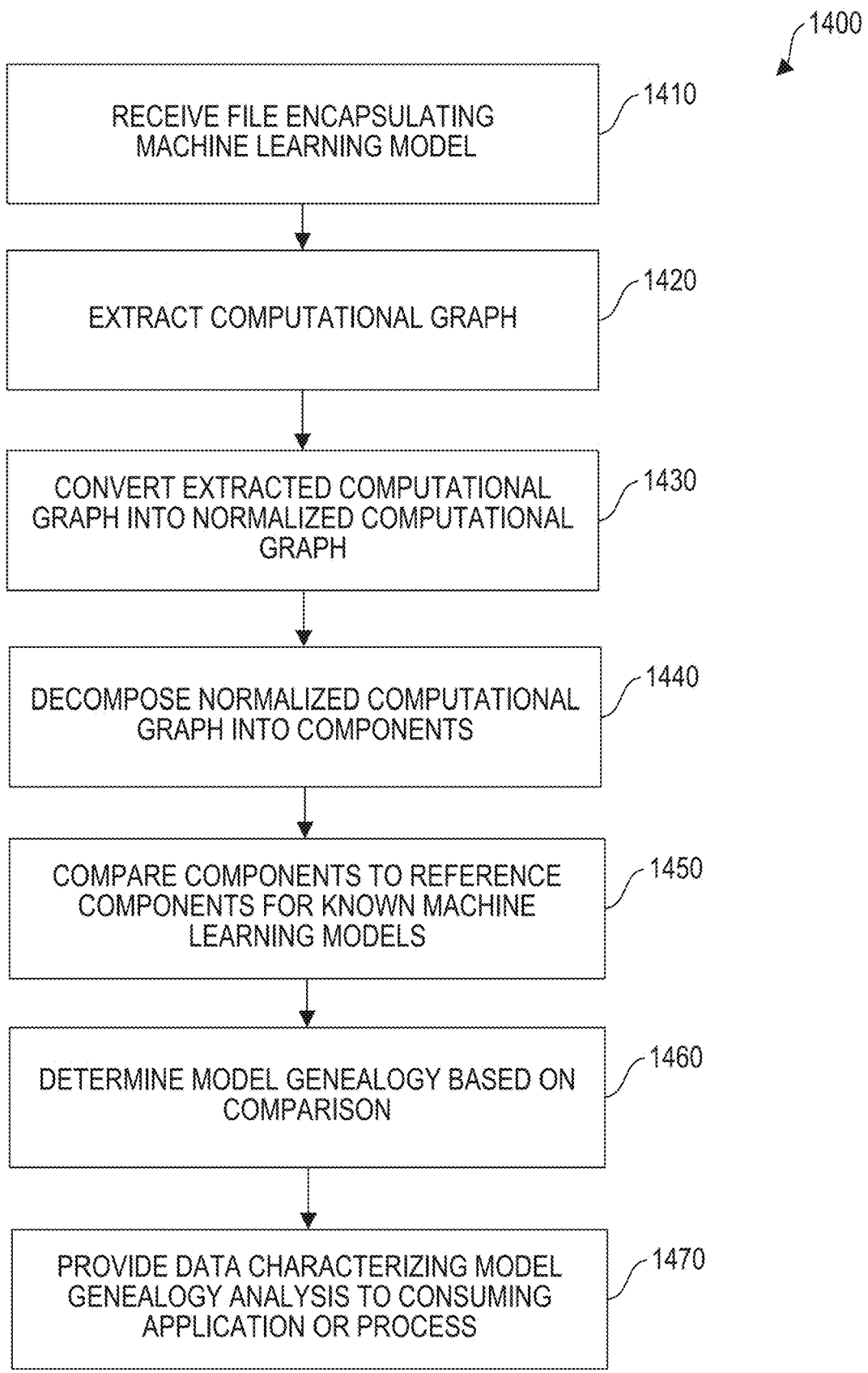
FIG. 14 is a process flow diagram illustrating a technique for determining the provenance or genealogy of a machine learning model.

FIG. 14 is a process flow diagram for determining the provenance or genealogy of a machine learning model 1400 in which, at 1410, at least one file is received which encapsulates the machine learning model. A computational graph is extracted, at 1420, from the file which corresponds to the machine learning model. Later, at 1430, the computational graph from a first format into a normalized computational graph which has a second, different format. The normalized computational graph is decomposed, at 1440, into components comprising: nodes, edges between nodes, blocks, and edges between blocks. The components of the normalized computational graph are compared, at 1450, with each of a plurality of normalized computational graphs each corresponding to a different known machine learning model. Based on this comparison, at 1460, a model genealogy of the machine learning model is determined. Data characterizing the model genealogy is provided, at 1470, to a consuming application or process.

Figure 15:
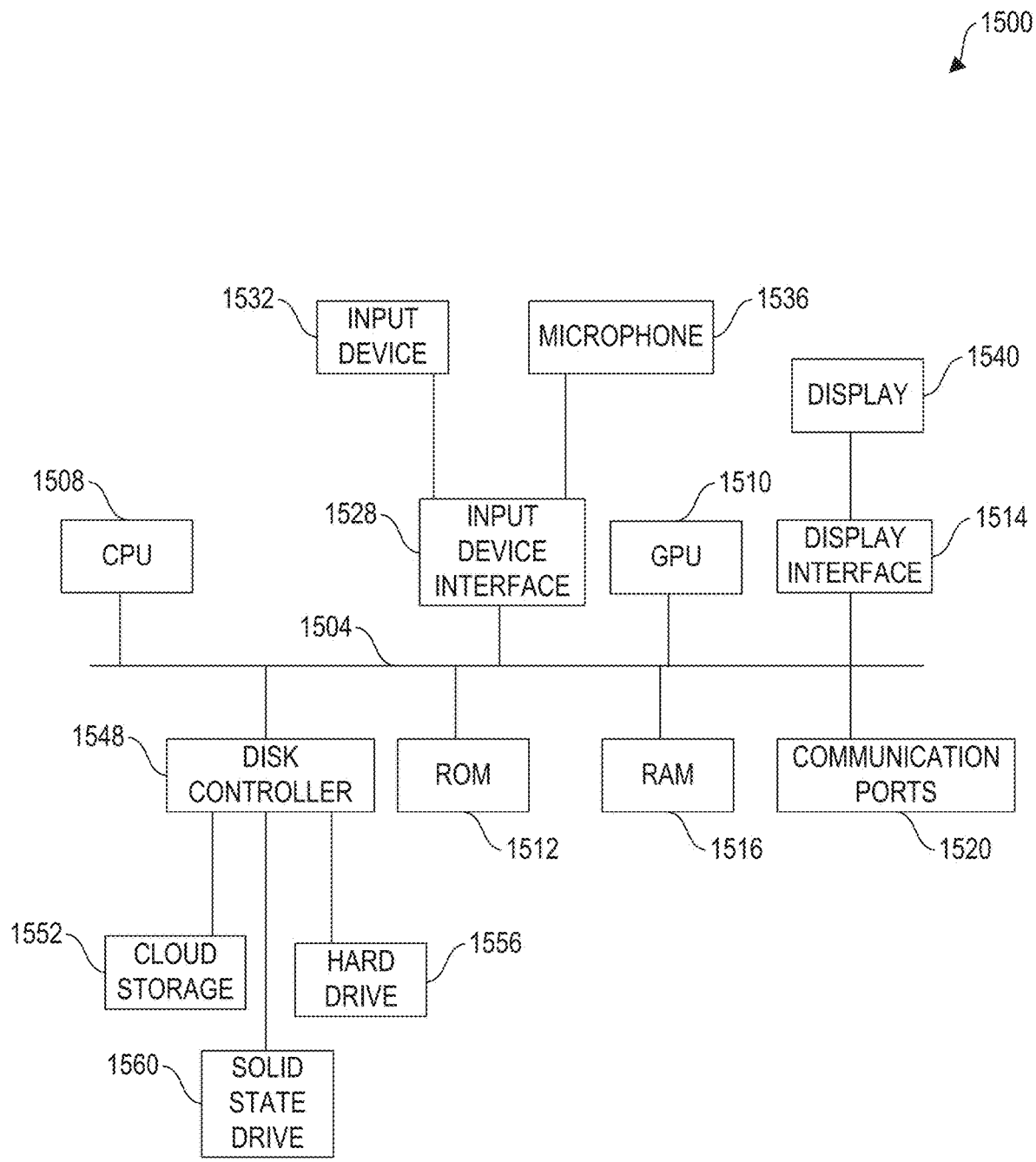
FIG. 15 is a diagram illustrating aspects of a computing device which can be used to implement the current subject matter.

FIG. 15 is a diagram 1500 illustrating a sample computing device architecture for implementing various aspects described herein. A bus 1504 can serve as the information highway interconnecting the other illustrated components of the hardware. A processing system 1508 labeled CPU (central processing unit) (e.g., one or more computer processors/ data processors at a given computer or at multiple computers), can perform calculations and logic operations required to execute a program. In addition, a processing system 1510 labeled GPU (graphics processing unit) (e.g., one or more computer processors/data processors at a given computer or at multiple computers), can perform calculations and logic operations required to execute a program. A non-transitory processor-readable storage medium, such as read only memory (ROM) 1512 and random access memory (RAM) 1516, can be in communication with the processing system 1508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1548 can interface with one or more optional drives to the system bus 1504. These drives can include cloud-connected storage 1552, external or internal drive including solid state drives 1560 or external or internal hard drives 1556. As indicated previously, these various disk drives 1552, 1556, 1560 and disk controllers are optional devices. The system bus 1504 can also include at least one communication port 1520 to allow for communication with external devices either physically connected to the computing system or available externally through a wired or wireless network. In some cases, the at least one communication port 1520 includes or otherwise comprises a network interface.

To provide for interaction with a user, the subject matter described herein can be implemented on a computing device having a display device 1540 (e.g., an LED, LCD, etc. monitor) for displaying information obtained from the bus 1504 via a display interface 1514 to the user and an input device 1532 such as keyboard and/or a pointing device (e.g., a mouse or a trackball) and/or a touchscreen by which the user can provide input to the computer. Other kinds of input devices 1532 can be used to provide for interaction with a user as well; for example, feedback provided to the user can be any form of sensory feedback (e.g., visual feedback, auditory feedback by way of a microphone 1536, or tactile feedback); and input from the user can be received in any form, including acoustic, speech, or tactile input. The input device 1532 and the microphone 1536 can be coupled to and convey information via the bus 1504 by way of an input device interface 1528. Other computing devices, such as dedicated servers, can omit one or more of the display 1540 and display interface 1514, the input device 1532, the microphone 1536, and input device interface 1528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for protecting a computing environment by identifying vulnerabilities in a machine learning model, the method being implemented by one or more computing devices and comprising:
   receiving at least one file encapsulating the machine learning model;
   extracting a computational graph corresponding to the machine learning model from the at least on file;
   converting the computational graph from a first format into a format-agnostic, normalized computational graph having a second, different format, the first format being an intermediate representation or low level format of the computational graph, the normalized computational graph for the machine learning model being same as a computational graph of the machine learning model in a third, different format;
   decomposing the normalized computational graph into components comprising: nodes, edges between nodes, blocks, and edges between blocks;
   scanning the normalized computational graph by iterating through the components to identify any backdoors, including by comparing relationships amongst the components with known signatures of backdoors and with known signatures of benign computational graphs;
   conducting a path analysis of the normalized computational graph, including identifying unused nodes or branches of nodes and identifying statistical anomalies or deviations of relationships of nodes, wherein the unused nodes or branches of nodes are identified by feeding data into the computational graph while monitoring use of nodes of the computational graph;
   conducting an operation analysis to determine computational resources utilized by the normalized computational graph in executing the machine learning model; and
   in response to identifying at least one backdoor, preventing the machine learning model from being loaded or deployed in the computing environment.

2. The method of claim 1 further comprising:
   visualizing at least a portion of the computational graph in a graphical user interface.

3. The method of claim 2, wherein components associated with a backdoor are visually distinguished in the graphical user interface.

4. The method of claim 1 further comprising: compressing the normalized computational graph prior to the scanning into a more compact representation.

5. The method of claim 1, wherein the scanning comprises: identifying operations specified by the components which introduce known vulnerabilities to the machine learning model.

6. The method of claim 1, wherein the scanning comprises: identifying blocks known to be malicious within the normalized computational graph.

7. The method of claim 1, wherein the extracted computational graph comprises an intermediate representation.

8. The method of claim 1, wherein the extracted computational graph comprises a low-level representation.

9. The method of claim 1 further comprising: traversing the normalized computational graph to identify architectural elements of the machine learning model.

10. The method of claim 9, wherein the architectural elements comprise:
    a head, a neck, and a backbone of the machine learning model.

11. The method of claim 1, wherein the scanning comprises:
extracting features from the components of the normalized computational graph; and
inputting the extracted features into a second machine learning model trained using a corpus of computational graphs to identify backdoors within the normalized computational graph.

12. The method of claim 11, wherein the second machine learning model comprises a graph neural network.

13. The method of claim 1 further comprising:
conducting a path analysis of the normalized computational graph.

14. The method of claim 13, wherein the path analysis identifies unused nodes or branches of nodes.

15. The method of claim 14, wherein the unused nodes or branches of nodes are identified by feeding data into the computational graph while monitoring use of nodes of the computational graph.

16. The method of claim 13, wherein the path analysis identifies statistical anomalies or deviations of relationships of nodes within the normalized computational graph.

17. The method of claim 1, wherein the computational resources comprises one or more of a: central processing unit (CPU), graphics processing unit (GPU), memory management unit (MMU), neural processing unit (NPU), tensor processing unit (TPU), or infrastructure processing unit (IPU).

18. The method of claim 1, wherein the operation analysis further determines whether the normalized computational graph includes instructions to execute a quantized version of the machine learning model.

19. The method of claim 1, wherein converting the computational graph from the first format into the format-agnostic, normalized computational graph comprises changing naming conventions of nodes and operators and rearranging nodes to map from the first format to the normalized computational graph.

20. The method of claim 1, further comprising, prior to the scanning, collapsing at least a portion of the normalized computational graph by combining all nodes forming part of a block, the block being characterized by nodes having only one non-constant input and one output.

21. The method of claim 1, wherein the scanning comprises detecting, within the normalized computational graph, a subgraph configured to apply equality and threshold comparisons to channel values, combine comparison results using logical conjunctions, reduce the results across spatial axes, cast the reduced results, and unsqueeze a dimension to produce a batch-size-by-one output.

22. The method of claim 1, wherein the scanning iterates at a block granularity by evaluating blocks, each block being a maximal subgraph in which any two nodes are connected by paths that do not pass through nodes outside the block.

23. The method of claim 1, wherein determining whether any backdoors were identified requires both: (i) a signature-based comparison of relationships among the components to libraries of malicious and benign components indicating a malicious match, and (ii) an output from a machine learning classifier, based on features extracted from the components, indicating a malicious classification.

24. A method for protecting a computing environment executing a machine learning model, the method being implemented by one or more computing devices and comprising:
receiving data characterizing the machine learning model;
extracting a computational graph corresponding to the machine learning model from the received data;
converting the computational graph from a first format into a normalized computational graph having a second, different format, the first format being an intermediate representation or low level format of the computational graph, the normalized computational graph for the machine learning model being same as a computational graph of the machine learning model in a third, different format;
decomposing the normalized computational graph into components comprising: nodes, edges between nodes, blocks, and edges between blocks;
scanning the normalized computational graph by iterating through the components to identify at least one backdoor, including by comparing relationships amongst the components with known signatures of backdoors and with known signatures of benign computational graphs;
conducting a path analysis of the normalized computational graph, including identifying unused nodes or branches of nodes and identifying statistical anomalies or deviations of relationships of nodes, wherein the unused nodes or branches of nodes are identified by feeding data into the computational graph while monitoring use of nodes of the computational graph;
conducting an operation analysis to determine computational resources utilized by the normalized computational graph in executing the machine learning model; and
preventing the machine learning model from being loaded or deployed in the computing environment based on the identified at least one backdoor.

25. A computer-implemented method for determining whether a machine learning model comprises malicious code, the method being implemented by one or more computing devices and comprising:
receiving data encapsulating or otherwise characterizing the machine learning model;
generating a computational graph corresponding to the machine learning model from the received data;
converting the computational graph from a first format into a normalized computational graph having a second, different format, the first format being an intermediate representation or low level format of the computational graph, the normalized computational graph for the machine learning model being same as a computational graph of the machine learning model in a third, different format; decomposing the normalized computational graph into components comprising: nodes, edges between nodes, blocks, and edges between blocks;
scanning the normalized computational graph by, using one or more processors, dynamically traversing the components in memory and applying a plurality of detection algorithms, the detection algorithms comprising:
i. comparing relationships amongst the components with known signatures of backdoors
ii. (ii) comparing relationships amongst the components with known signatures of benign computational graphs, and
iii. iii) identifying operations specified by the components which introduce known vulnerabilities to the machine learning model, wherein the detection algorithms are format-agnostic and operate on the normalized computational graph;

in response to identifying a backdoor or vulnerability, automatically initiating at least one remediation action, the remediation action comprising preventing the machine learning model from being loaded or deployed in a computing environment; and providing data characterizing whether any backdoors or vulnerabilities were identified to a consuming application or process.

26. A system for identifying vulnerabilities in a machine learning model and protecting a computing environment comprising:

at least one processor; and a memory storing instructions that, when executed by the at least one processor, cause the system to:

receive at least one file encapsulating the machine learning model; extract a computational graph corresponding to the machine learning model from the at least one file;

convert the computational graph from a first format into a format-agnostic, normalized computational graph having a second, different format, the first format being an intermediate representation or a low-level format of the computational graph, the normalized computational graph for the machine learning model being same as a computational graph of the machine learning model in a third, different format;

decompose the normalized computational graph into components comprising: nodes, edges between nodes, blocks, and edges between blocks, wherein a block is a maximal subgraph having a single non-constant input and a single output;

scan the normalized computational graph by iterating through the components to identify backdoors, including by comparing relationships amongst the components with known signatures of backdoors and with known signatures of benign computational graphs, and by extracting features from the components of the normalized computational graph and inputting the extracted features into a second machine learning model trained using a corpus of computational graphs to identify backdoors within the normalized computational graph, wherein the second machine learning model comprises a graph neural network;

conduct a path analysis of the normalized computational graph, including identifying unused nodes or branches of nodes and identifying statistical anomalies or deviations of relationships of nodes, wherein the unused nodes or branches of nodes are identified by feeding data into the computational graph while monitoring use of nodes of the computational graph;

conduct an operation analysis to determine computational resources utilized by the normalized computational graph in executing the machine learning model, the computational resources comprising one or more of a: central processing unit (CPU), graphics processing unit (GPU), memory management unit (MMU), neural processing unit (NPU), tensor processing unit (TPU), or infrastructure processing unit (IPU), and determine whether the normalized computational graph includes instructions to execute a quantized version of the machine learning model; and in response to identifying at least one backdoor, prevent the machine learning model from being loaded or deployed in the computing environment.

* * * * *